US011102666B2

(12) United States Patent
Usaj et al.

(10) Patent No.: US 11,102,666 B2
(45) Date of Patent: Aug. 24, 2021

(54) METHODS AND APPARATUS TO MONITOR WI-FI MEDIA STREAMING USING AN ALTERNATE ACCESS POINT

(71) Applicant: The Nielsen Company (US), LLC, New York, NY (US)

(72) Inventors: Marko Usaj, Izola (SI); Andrej Barbis, Ilirska Bistrica (SI); Marko Panger, Skofije (SI); Joze Arh, Rakek (SI)

(73) Assignee: THE NIELSEN COMPANY (US), LLC, New York, NY (US)

( * ) Notice: Subject to any disclaimer, the term of this patent is extended or adjusted under 35 U.S.C. 154(b) by 54 days.

(21) Appl. No.: 16/514,996

(22) Filed: Jul. 17, 2019

(65) Prior Publication Data

US 2020/0296608 A1    Sep. 17, 2020

Related U.S. Application Data

(60) Provisional application No. 62/819,423, filed on Mar. 15, 2019.

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
CPC .............................. H04W 24/08; H04W 84/12
See application file for complete search history.

(56) References Cited

U.S. PATENT DOCUMENTS

| | | |
|---|---|---|
| 2003/0219008 A1 | 11/2003 | Hrastar |
| 2009/0125595 A1 | 5/2009 | Maes |
| 2010/0238871 A1 | 9/2010 | Tosic et al. |
| 2013/0156016 A1 | 6/2013 | Debnath et al. |
| 2016/0323706 A1* | 11/2016 | Splaine ............... H04W 4/023 |
| 2018/0359605 A1 | 12/2018 | Splaine et al. |
| 2019/0149994 A1* | 5/2019 | Van Antwerp ........ H04W 8/005 726/4 |

FOREIGN PATENT DOCUMENTS

JP      2018142929      9/2018

OTHER PUBLICATIONS

Kohlios et al., 'A Comprehensive Attack Flow Model and Security Analysis for Wi-Fi and WPA3, MDPI: Electronics, Retrieved from: https://www.mdpi.com/2079-9292/7/11/284/pdf, (Oct. 30, 2018) (Year: 2018).*

(Continued)

*Primary Examiner* — Brian P Cox
(74) *Attorney, Agent, or Firm* — Hanley, Flight & Zimmerman, LLC

(57) ABSTRACT

Methods, apparatus, systems and articles of manufacture are disclosed to monitor WI-FI media streaming using alternate access points. An example apparatus disclosed herein monitor wireless traffic includes an example traffic monitor to identify a connection of a WI-FI client to a primary access point and capture a management frame transmitted from the primary access point to the WI-FI client. The example apparatus further includes an example frame generator to insert a change channel announcement into the captured management frame and a router to cause a wireless interface to transmit the beacon frame to the WI-FI client.

17 Claims, 8 Drawing Sheets

(56) References Cited

OTHER PUBLICATIONS

International Searching Authority, "International Search Report," dated Jul. 7, 2020 in connection with International Patent Application No. PCT/US2020/022829, 3 pages.
International Searching Authority, "Written Opinion," dated Jul. 7, 2020 in connection with International Patent Application No. PCT/US2020/022829, 5 pages.
Occupytheweb, "Creating an Evil Twin Wireless Access Point to Eavesdrop on Data," How to Hack Wi-Fi, Jul. 18, 2013, 20 pages.

* cited by examiner

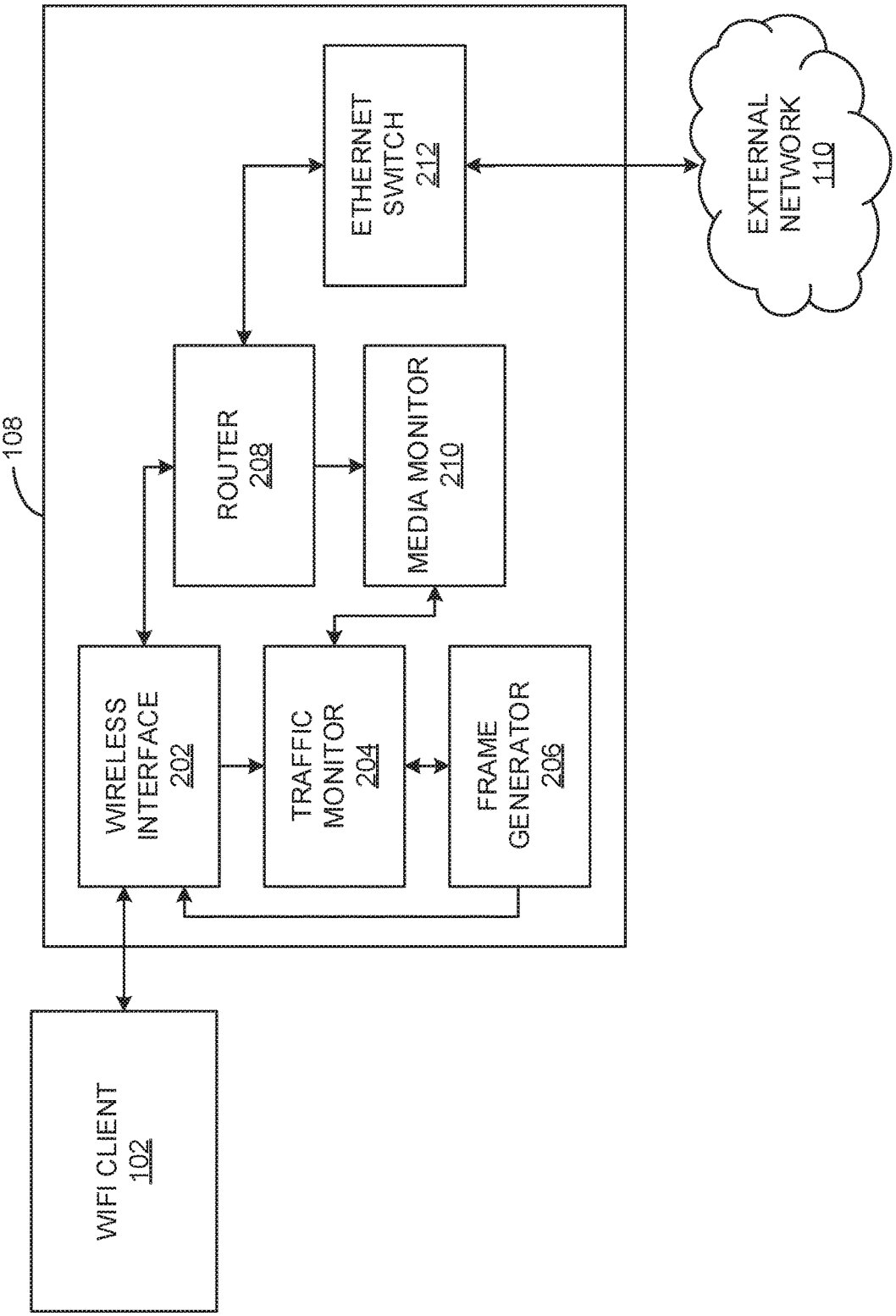

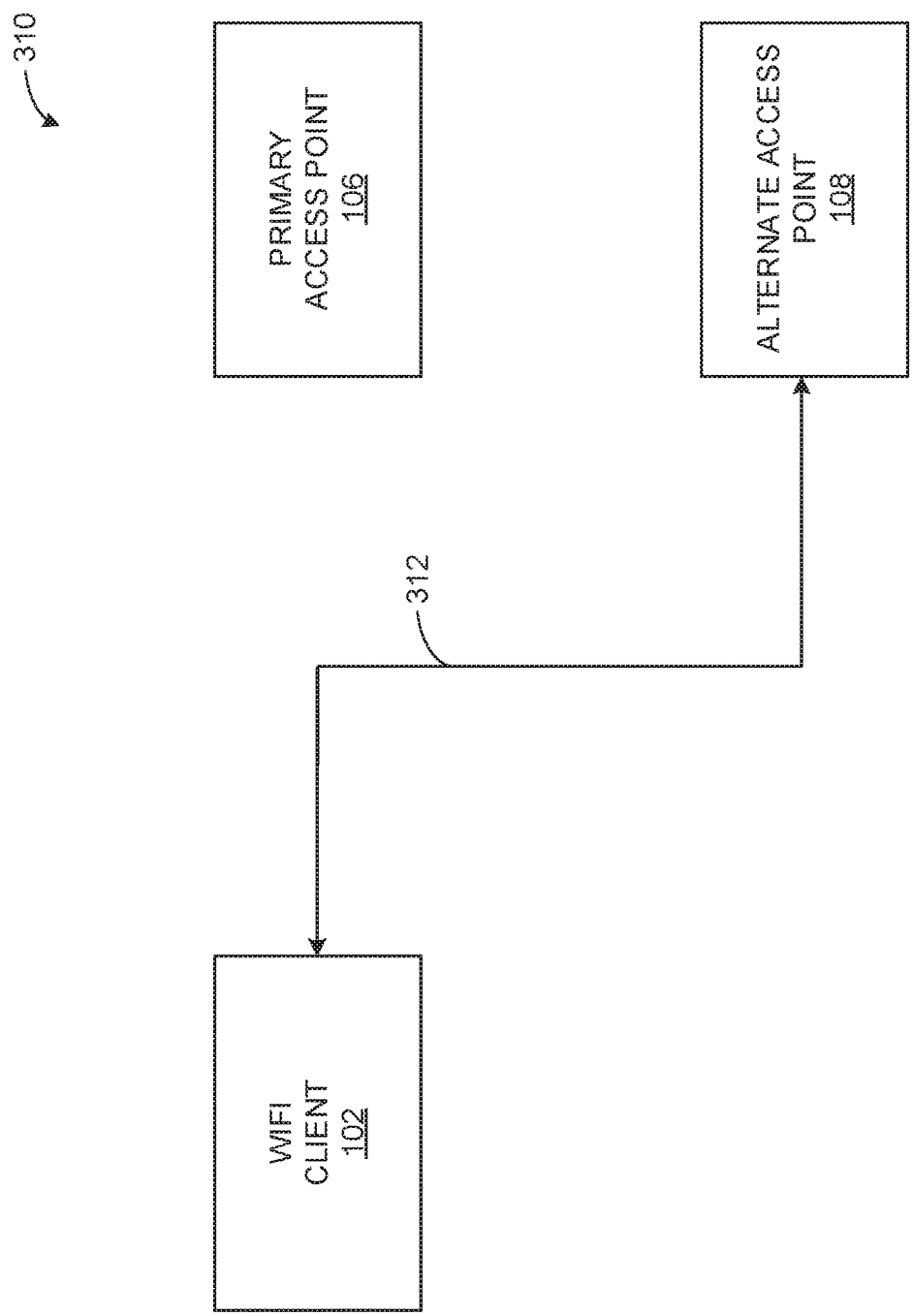

METHODS AND APPARATUS TO MONITOR WI-FI MEDIA STREAMING USING AN ALTERNATE ACCESS POINT

FIELD OF THE DISCLOSURE

This disclosure relates generally to media monitoring, and, more particularly, to methods and apparatus to monitor WI-FI media streaming using an alternate access point.

BACKGROUND

In recent years, media devices have been provided with Internet connectivity and the ability to retrieve media from the Internet. As such, media exposure has shifted away from conventional methods of presentation such as broadcast television, towards presentation via consumer devices accessing media via the Internet.

Media providers and/or other entities such as advertising companies, broadcast networks, etc. are often interested in the viewing, listening, and/or media behavior of audience members and/or public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to be monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisement) based on the collected media measurement data.

BRIEF DESCRIPTION OF THE DRAWINGS

FIG. 2 is a block diagram an example implementation of the alternate access point of FIG. 1.

FIGS. 3A-3C are block diagrams illustrating interactions between the alternate access point, the WI-FI client device, and the client access point.

The figures are not to scale. Instead, the thickness of the layers or regions may be enlarged in the drawings. In general, the same reference numbers will be used throughout the drawing(s) and accompanying written description to refer to the same or like parts.

Figure 1:
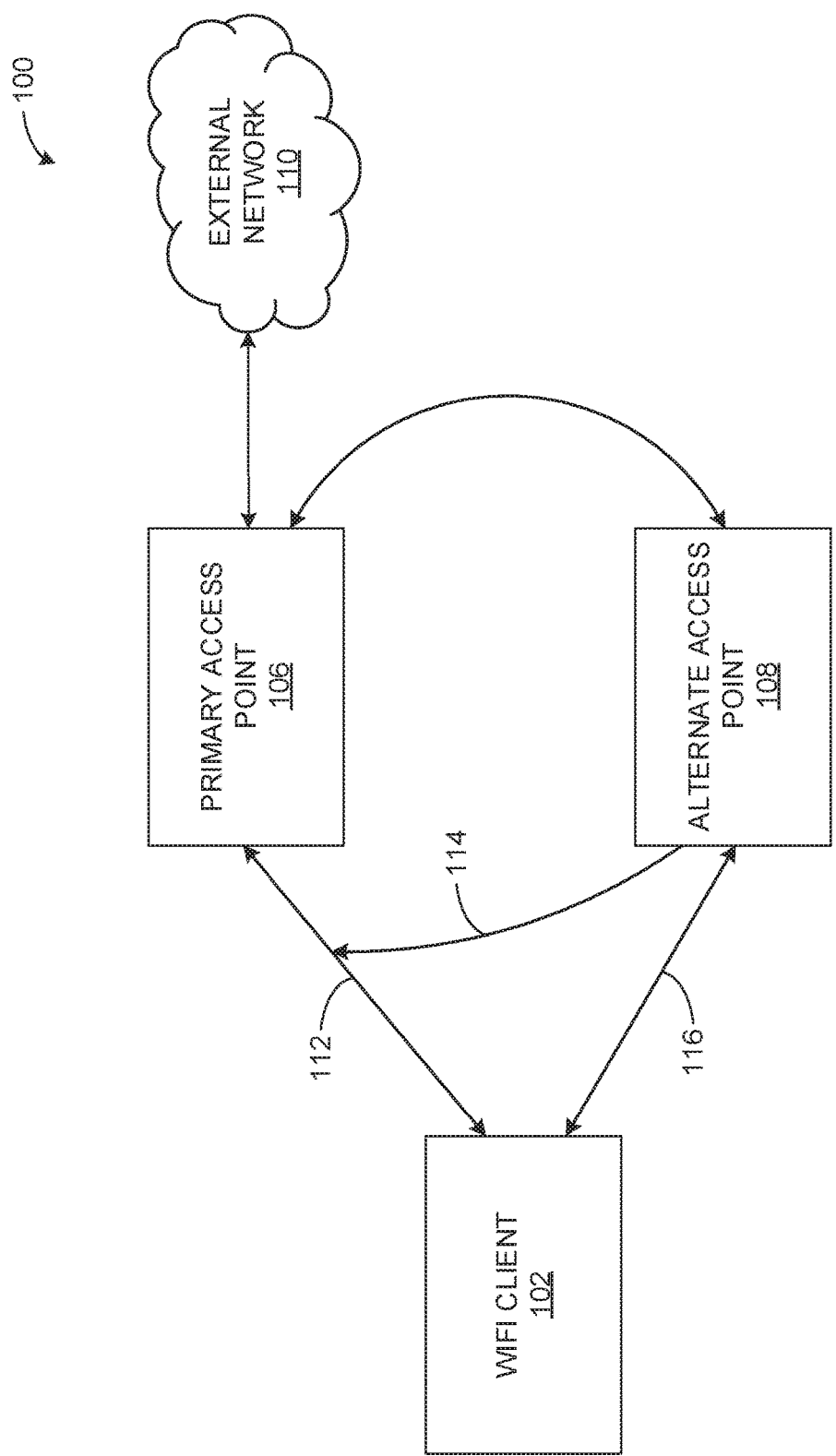
FIG. 1 is a block diagram of an example environment in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Media monitors can be installed into consenting households to monitor media consumed in that household. With recent advances in Internet technology, streaming media have become a major source of media for consumers. Certain types of media monitors, called streaming meters, allow media streamed over a network (e.g., the Internet, etc.) to be monitored. In some examples, streaming meters monitor home wireless networks (e.g., WI-FI networks, etc.) to collect records of media streamed to media devices in the home. In some examples, streaming meters use packet injection and false disassociation/deauthentication to gain passively monitor WI-FI traffic (e.g., by obtaining a Wi-Fi Protected Access 2 (WPA2) session key, etc.).

As used herein, streaming refers to a transmission of an object in which the object is used by the destination before entirety of the object is received by the destination. For example, streaming media refers to the transmission of a media object (e.g., a video file, an audio file, etc.), wherein presentation of the media object at a destination may begin before the entirety of the media object is received by the destination. While examples described herein refer to monitoring streaming media, any type of media that travels via a wireless network such as a WI-FI network may be monitored in accordance with this disclosure.

Current streaming meter methods suffer from several problems that make monitoring WI-FI traffic difficult. Firstly, WI-FI Access Points protected management frames (e.g., as described in Institute of Electrical and Electronics Engineers (IEEE) 802.11w) prevent the streaming meter from forcibly disconnecting a WI-FI client using packet injection, which further prevents the streaming meter from decoding the associated WI-FI traffic. Secondly, future WI-FI security protocols (e.g., WPA3, etc.) may utilize encryption to prevent a third party device from obtaining session keys from traffic monitoring. In such examples, future WI-FI security protocols may only allow bandwidth usage to be determined by a snooping device and not allow for the collection of details of wireless transactions. Thirdly, multiple input/multiple output (MIMO) configurations and multi-user multiple input/multiple output (MU-MIMO) configurations make determining the location of the streaming meter more important in decoding the traffic. In some examples, such configurations make reconstructing multiple signals into useful data difficult.

Methods, apparatus and systems disclosed herein enable the monitoring of WI-FI traffic using an alternate access point installed into a home with the same network credentials (e.g., Service Set Identifier (SSID), password, etc.) as the home's primary access point on a different channel. In some examples disclosed herein, the alternate access point, referred to as an alternate access point, includes a router, a traffic monitor, a media monitor, a frame generator and an ethernet switch. In some examples disclosed herein, the router is used for communication with clients and provides conventional access point functionalities. In some examples disclosed herein, the traffic monitor is used to monitor traffic of the household's access point and for packet generation. In some examples disclosed herein, the frame generator can reroute traffic to the alternate access point using a fake channel change announcement (e.g., imposter channel change announcement, etc.). In such examples disclosed herein, the alternate access point can capture a frame (e.g., a beacon frame) associated with the primary access point and insert a channel change announcement to instruct the Wi-Fi client to switch to the channel associated with the alternate access point.

FIG. 1 is a block diagram of an example environment 100 in which the teachings of this disclosure may be implemented. In the illustrated example, the environment 100 includes an example WI-FI client 102, an example primary access point 106, an example alternate access point 108 and an example external network 110. In the illustrated example, the WI-FI client 102 and the primary access point 106 exchange first communications 112, which include media requests transmitted by the WI-FI client. In the illustrated example, the alternate access point 108 transmits second communications 114 which causes the primary access point 106 to disconnect from the WI-FI client 102. In the illustrated example, the alternate access point 108 and the example WI-FI client 102 exchange third communications 116 include media requests transmitted by the WI-FI client. In the illustrated example, the environment 100 is a home of a consumer. In other examples, the environment 100 can be any area in which streaming media is viewed (e.g., public transit, a business, etc.).

The example WI-FI client 102 is a device that retrieves media from the external network 110 for presentation. In some examples, the WI-FI client 102 is capable of directly presenting media (e.g., via a display). In other examples, the WI-FI client 102 can present the media on separate media presentation equipment (e.g., speakers, a display, etc.). Thus, the WI-FI client 102 may or may not be able to present media without assistance from a second device. WI-FI clients are typically consumer electronics. For example, the WI-FI client 102 can be an Internet-enabled mobile device (e.g., a smartphone, a portable music player, a portable video player, etc.), video game consoles, tablet computers, digital media players (e.g., digital video recorder, over-the-top devices, etc.), smart televisions, desktop computers, laptop computers, servers, etc.

The example primary access point 106 is a networking device that facilities connection between WI-FI client 102 and the external network 110. In some examples, the primary access point 106 is a hardware device provided by the internet provider of environment 100. In some examples, the primary access point 106 can be connected to a router. In other examples, the primary access point 106 can be integrated into a router. In the illustrated example, the primary access point 106 communicates with the WI-FI client 102 using management frames (e.g., beacon frames, etc.). In some examples, the WI-FI client 102 and the primary access point 106 exchange first communications 112 which can include the management frames, media requests, etc.

The example alternate access point 108 is networking device that facilitates a connection between the WI-FI client 102 and the external network 110. In the illustrated example, the alternate access point 108 has the same network credentials (e.g., the same SSID and password, etc.) as the primary access point 106. In some examples, the alternate access point 108 has a different channel than the primary access point 106. In some examples, the primary access point 106 is a hardware device provided by a monitoring agency (e.g., a monitoring element of a media provider, an independent monitoring entity, etc.). In some examples, the alternate access point 108 monitors the traffic of the primary access point 106 (e.g., via the second communications 114, etc.). In some examples, the alternate access point 108 can intercept a management frame sent by the primary access point 106 to the WI-FI client 102. In such examples, the primary access point 106 can insert a channel change request into the management frame. In some examples, the channel change request can conform to the standard set forth in IEEE 802.11h. In such examples, the channel change request is a broadcast packet and cannot be protected by 802.11w.

In some examples, the channel change request can instruct the WI-FI client 102 to connect to the alternate access point 108. In some examples, once the WI-FI client 102 is connected to the alternate access point 108 (e.g., via the third communications 116), the alternate access point 108 can directly connect to the external network 110 (not depicted.) In other examples, the alternate access point 108 can connect the WI-FI client 102 to the external network 110 via any other suitable means. In some examples, when presented with two access points with the same SSID, a WI-FI client (e.g., the WI-FI client 102, etc.) will connect to the access point with the strongest signal. In such examples, the alternate access point 108 can be configured to have a stronger signal than the primary access point 106. In some examples, when the WI-FI client 102 is connected to the alternate access point 106, the WI-FI client 102 can transmit the example third communications 116. In such examples, the example third communications 116 can include the media requests. In some examples, the alternate access point 108 can create records of media transmitted to the WI-FI client via the alternate access point 108. In some examples, if the alternate access point 108 fails (e.g., a power failure, etc.), the WI-FI client 102 will automatically reconnect to the primary access point 106 (e.g., by reassuming the communications 112). In some examples, the example alternate access point 108 can also be physically connected to one or more media devices (e.g., via an ethernet connection, etc.). In such examples, the alternate access point 106 can also monitor traffic transmitted via the physical connection.

The example external network 110 is an example network that extends over an area larger than the environment 100. For example, the external network 110 can include the Internet, a wide-area network (WAN), etc. The example external network 110 allows the WI-FI client 102 to connect to a web-location that contains media (e.g., a server associated with a streaming service, etc.). In such examples, the external network 110 can facilitate to the transmission of the media to the WI-FI client 102 via the primary access point 106 and/or the alternate access point 108.

FIG. 2 is a block diagram an example implementation of the alternate access point 108 of FIG. 1. The example alternate access point 108 includes an example wireless interface 202, an example traffic monitor 204, an example frame generator 206, an example router 208, an example media monitor 210 and an example ethernet switch 212.

The example wireless interface 202 receives wireless transmissions transmitted within its detection range and transmits wireless signals from the alternate access point 108 to the WI-FI client 102. For example, the example wireless interface 202 can receive transmissions from the WI-FI client 102 and/or the alternate access point 108. In some examples, the wireless interface 202 can configure the network credentials (e.g., the SSID, the password, etc.) of the alternate access point 108. For examples, the wireless interface 202 can receive instructions to change the SSID and password of the alternate access point 108 to that of the primary access point 106. In other examples, the wireless interface 202 can configure any other suitable characteristics of the alternate access point 108. In some examples, the wireless interface 202 can be implemented using multiple interfaces. In such examples, a first one or more wireless interfaces may monitor traffic and/or packet injection. In such examples, a second one or more wireless interfaces may facilitate standard communication with the WI-FI clients (e.g., the WI-FI client 102, etc.). In some such examples, the first one or more wireless interfaces may not include any of the second one or more wireless interfaces. In other examples, one or more wireless interfaces may be shared by the first one or more wireless interfaces and the second one or more wireless interfaces.

The example traffic monitor 204 monitors the traffic of the primary access point 106. In some examples, the traffic monitor 204 can additionally craft the packets used to interact with the WI-FI client 102. In some examples, the traffic monitor 204 can detect and intercept the management frames transmitted by the primary access point 106. In some examples, the traffic monitor 204 can query the router 208 to determine the network addresses of packets transmitted and/or intercepted via the alternate access point 108. For example, the traffic monitor 204 can identify identifiers (e.g., a MAC address, an SSID, etc.) identified in the communications between the Wi-Fi client 102 and the primary access point 106 that indicate the identity of the Wi-Fi client 102 and the primary access point 106. In some examples, the traffic monitor 204 can analysis traffic transmitted via the alternate access point 108. In such examples, the traffic monitor 204 can identify traffic related to media requests from streaming services. In some examples, the traffic monitor 204 can also monitor traffic transmitted over one or more physical connections.

The example frame generator 206 generates and/or modifies frames to be transmitted by the router 208 via the wireless interface 202. For example, the frame generator 206 can generate management, control and/or data frames to be used to modify the connection between the WI-FI client 102, the primary access point 106 and/or the alternate access point 108. For example, the frame generator 206 can modify a captured beacon frame to include a channel change request. In some examples, the frame generator 206 identifies the section of the management frame associated with transmission channel. In such examples, the frame generator 206 inserts, modifies and/or otherwise changes the channel associated with the captured modified frame. In such examples, the frame generator 206 can cause the captured beacon frame to include instructions for the WI-FI client 102 to connect to the channel associated with the alternate access point 108.

The example router 208 is used for communications with WI-FI clients (e.g., the WI-FI client 102) and to allow the alternate access point 108 with conventional access point functionalities. For example, the router 208 can direct data packets received via the wireless interface 202 and/or external network 110 to their intended destinations. In such examples, the router 208 can detect a network address embedded in the packet to determine the destination of the packet. In some examples, the traffic monitor 208 and/or the media monitor 210 can interface with the router 208 to receive the network address. In some examples, the router 208 can include any number of individual routers configured to specific WI-FI transmission bands (e.g., 2.4 GHz, 5 GHz, etc.).

The example media monitor 210 analyzes media requests transmitted via the alternate access point 108. For example, the media monitor 210 can extract information from a media request (e.g., a request to stream media from a streaming service, etc.) that includes media identifying information. In some examples, the media monitor 210 extracts a watermark and/or generates a fingerprint based on the transmitted media request. In some examples, the media monitor 210 correlates the destination of the media request (e.g., a particular streaming service, etc.) and the media request to identify the media associated with the media request (e.g., via a look-up table, etc.). In some examples, the media identifying information can include user identifying information. In some examples, the media monitor 210 can transmit the extracted media identifying information to a central facility of an audience measurement entity. In such examples, the media monitor 210 can transmit the media identifying information periodically or continuously. In some examples, the media monitor 210 can store the media identifying information on a memory associated with the alternate access point 108. In such examples, the media identifying information can manually be retrieved by a technician associated with the audience measurement entity.

The example ethernet switch 212 enables ethernet connections into the alternate access point 108. For example, the ethernet switch 212 allows the alternate access point 108 to be physically connected with a media device (e.g., a personal computer, etc.). In such examples, the ethernet switch 212 allows the alternate access point 108 to monitor media transmitted to physically connected devices (e.g., over an ethernet cable, etc.). In some examples, the ethernet switch 212 can be coupled to the primary access point 106 (e.g., as illustrated in FIG. 1, etc.). In other examples, the ethernet switch 212 can be coupled to any suitable external connection. In some examples, the ethernet switch 212 can be absent. In such examples, the alternate access point 108 can communicate with the external network via wireless communication.

While an example manner of implementing the alternate access point 108 of FIG. 1 is illustrated in FIG. 2, one or more of the elements, processes and/or devices illustrated in FIG. 2 may be combined, divided, re-arranged, omitted, eliminated and/or implemented in any other way. Further, the example wireless interface 202, the example traffic monitor 204, the example frame generator 206, the example router 208, the example media monitor 210, the example ethernet switch 212 and/or, more generally, the example alternate access point 108 of FIG. 2 may be implemented by hardware, software, firmware and/or any combination of hardware, software and/or firmware. Thus, for example, any of the example wireless interface 202, the example traffic monitor 204, the example frame generator 206, the example router 208, the example media monitor 210, the example ethernet switch 212 and/or, more generally, the example alternate access point 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the wireless interface 202, the example traffic monitor 204, the example frame generator 206, the example router 208, the example media monitor 210 and/or the example ethernet switch 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example alternate access point 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
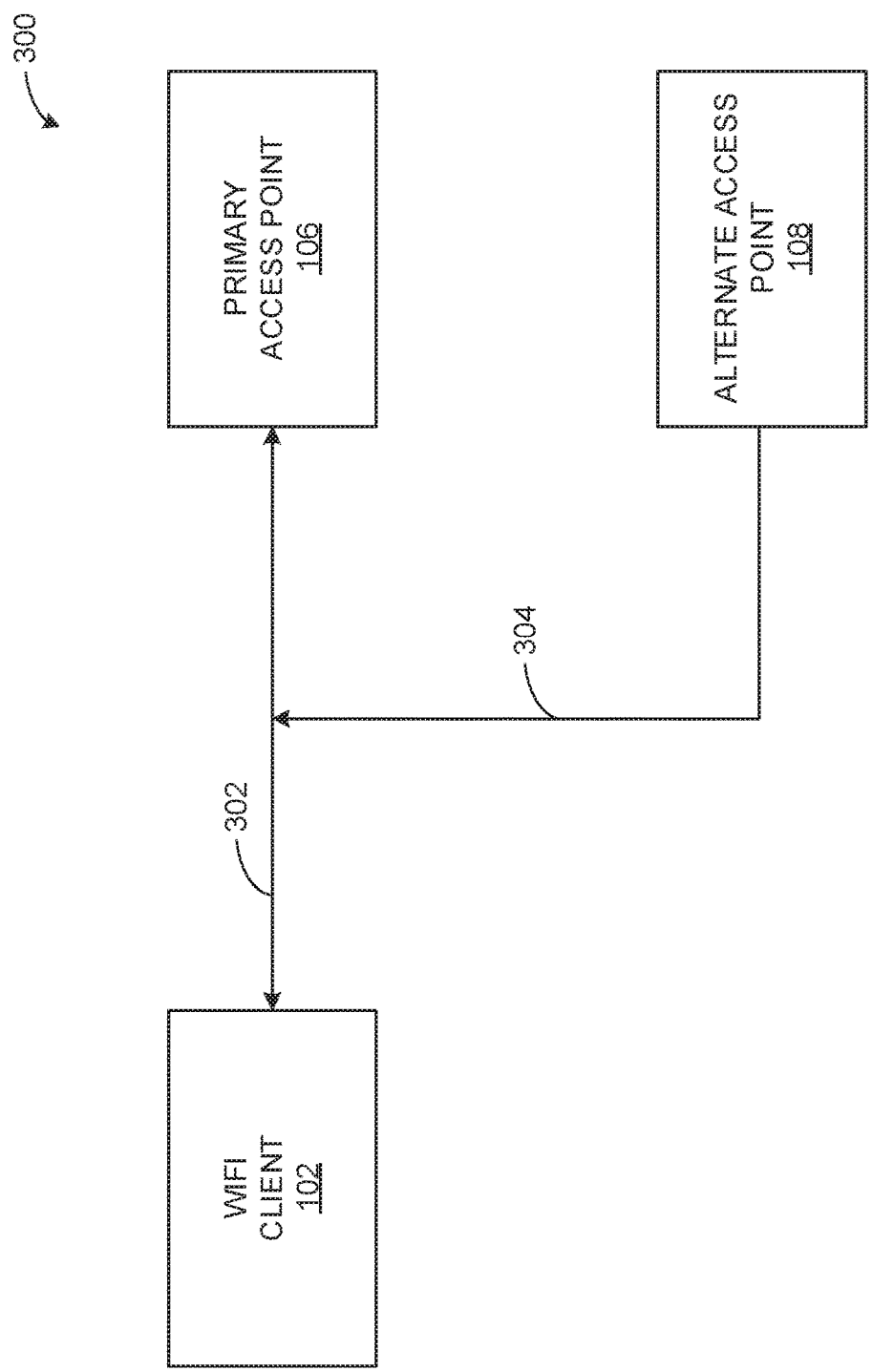
Figure 3B:
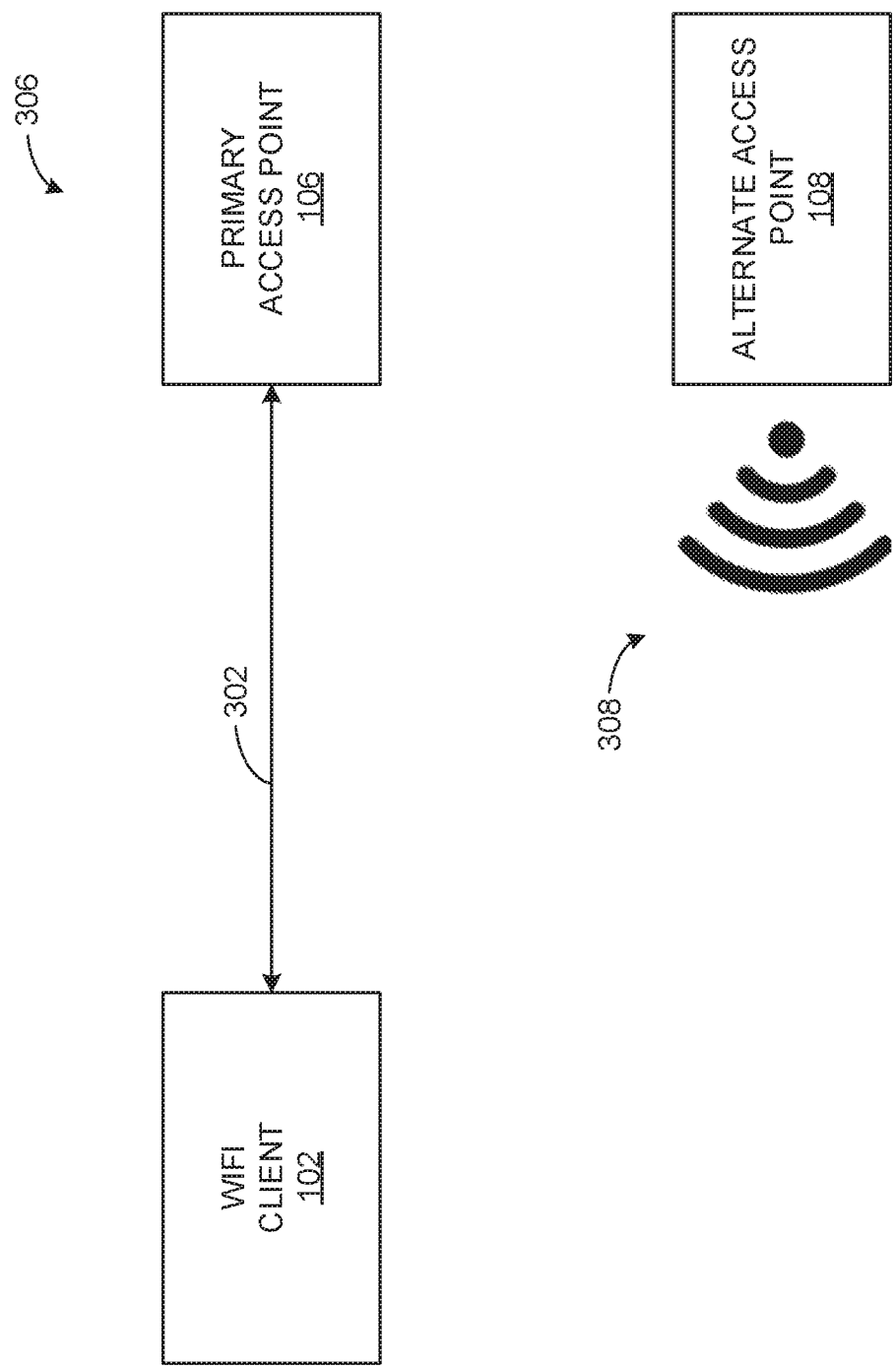

FIGS. 3A-3C are block diagrams illustrating interactions between the WI-FI client 102, the alternate access point 108, and the primary access point 106. FIG. 3A depicts an example first configuration 300. The first configuration 300 depicts the example WI-FI client 102 and the primary access point 106 establishing an example connection 302. In the illustrated example of FIG. 3A, the alternate access point 108 can detect the connection 302 with an interception 304. For example, the traffic monitor 204 can detect the connection 302 and capture a beacon frame associated with the connection 302. In some examples, the beacon frame is not protected (e.g., encrypted, etc.) so the alternate access point 108 can intercept and read it without decryption.

FIG. 3B depicts the example configuration 306 after the alternate access point 108 has monitored the connection 302. The example first configuration 300 depicts the example alternate access point 108 transmitting an example channel change command 308. In some examples, the example channel change command 308 includes a command to change the channel associated with the connection 302 (e.g., the channel of the primary access point 106, etc.) to the channel associated with the alternate access point 108. In some examples, the WI-FI client 102 can receive the channel change command 308.

FIG. 3C depicts the example configuration 310 after the WI-FI client 102 has received the channel change command 308. In the illustrated example of FIG. 3C, the WI-FI client 102 has established the connection 312 to the alternate access point 108. In such examples, the WI-FI client 102 transmits media requests via the alternate access point 108.

Figure 4:
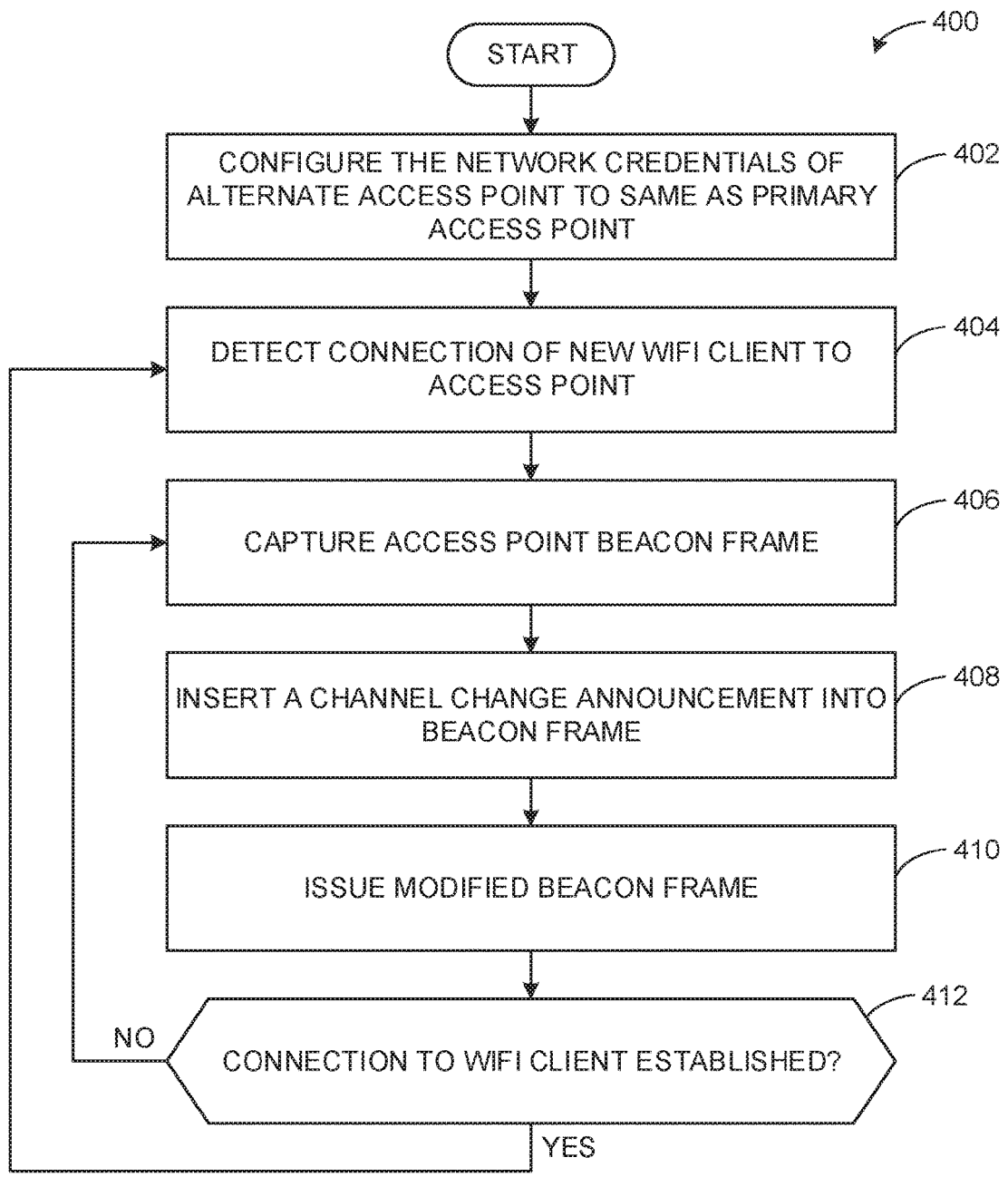
FIGS. 4-5 are a flowcharts representative of machine readable instructions which may be executed to implement the alternate access point of FIGS. 1 and/or 2.
Figure 5:
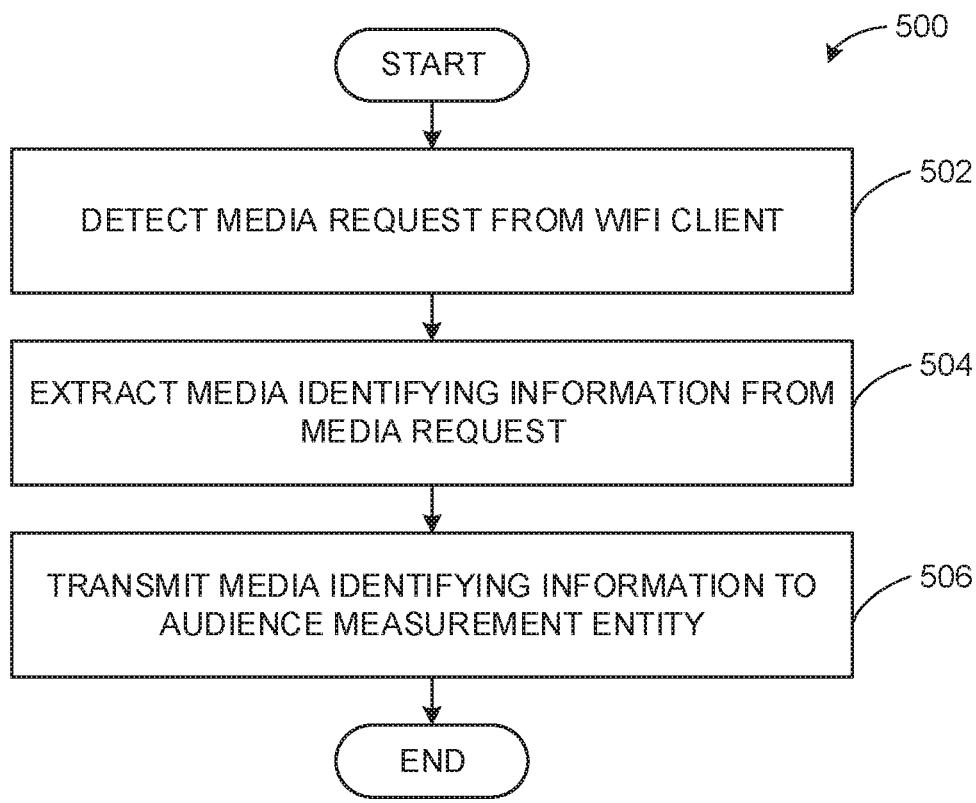

Flowcharts representative of example hardware logic, machine readable instructions, hardware implemented state machines, and/or any combination thereof for implementing the alternate access point 108 of FIG. 2 are shown in FIGS. 4 and 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4 and 5, many other methods of implementing the example alternate access point 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 400 of FIG. 4 includes block 402. At block 402, the wireless interface 202 configures the network credentials of the alternate access point 108 to the same as the primary access point 106. For example, the wireless interface 202 can receive the SSID and password from the household associated with the primary access point 106. In some examples, a technician installing the alternate access point 108 can ask a member of the household for the password. In such examples, the technician can provide the network credentials to the alternate access point via the wireless interface 202. In other examples, the wireless interface 202 can configure any other suitable credentials of the alternate access point 108. In other examples, the wireless interface 202 can receive network credentials (e.g., the SSID and/or password) by any other suitable means.

At block 404, the traffic monitor 204 detects connection of the WI-FI client 102 to the primary access point 106. For example, the traffic monitor 204 can detect the transmission of a beacon frame from the primary access point 106 to the WI-FI client 102 via transmissions detected by the wireless interface 202. In some examples, the wireless interface 202 can determine identifier(s) included in the communications between the WI-FI client 102 to the primary access point 106 (e.g., a MAC address, an SSID, etc.). In some examples, the traffic monitor 204 can detect any other suitable transmission from the primary access point 106.

At block 406, the traffic monitor 204 captures a beacon frame from the primary access point 106. For example, the traffic monitor 204 receives a beacon frame detected by traffic monitor during the execution from block 404. In some examples, the traffic monitor 204 can wait for a beacon frame to be transmitted by the primary access point 106. In some examples, the traffic monitor 204 can identify the transmitted beacon frame based on an identifier associated with WI-FI client 102 and/or the primary access point 106. In other examples, the traffic monitor 204 can capture a beacon frame by any other suitable means.

At block 408, the frame generator 206 inserts a channel change announcement into the capture beacon frame. For example, the frame generator 206 can insert a channel change announcement into the captured beacon frame that causes the WI-FI client 102 to connect to the alternate access point 108. In such examples, because the alternate access point 108 has the same network credentials as the primary access point 106, the WI-FI client 102 can connect to the primary access point 106 without additional information in the event of a failure of the alternate access point 108. At block 410, the frame generator 206 outputs the modified beacon frame to WI-FI client 102 via the wireless interface 202. For example, the WI-FI client 102 can receive the modified beacon frame and begin communication with the alternate access point 108.

At block 412, the router 208 determines if a connection between the alternate access point 108 and the WI-FI client 102 has been established. For example, the router 208 can determine if packets and/or frames are being exchanged between the WI-FI client 102 and/or alternate access point 108. If the connection has been established, the process 400 returns to block 404. If the connection has not been established, the process 400 returns to block 406.

The program 500 of FIG. 5 begins at block 502. At block 502, the traffic monitor 204 to detect a media request from the WI-FI client 102. For example, the traffic monitor 204 can detect a request transmitted to a streaming service via the alternate access point. In other examples, the traffic monitor 204 can detect a media request by any other suitable method.

At block 504, the example media monitor 210 extracts media identifying information from media request. For example, the media monitor 210 can extract a media identifier from the media identifier. In some examples, the media monitor 210 can extract other information from the media request (e.g., demographic information associated with a user of the WI-FI client 102, a timestamp related to the At block 506, the router 208 transmits media identifying information to the audience measurement entity. For example, the router 208 can cause the media identifying to be transmitted via the ethernet switch 212. In other examples, the router 208 can cause the media identifying information to be transmitted via any other suitable means (e.g., wireless, cellular, etc.). Additionally or alternatively, the media identifying information can be stored on a memory associated with the alternate access point 108. In such examples, the media identifying information can be retrieved from the alternate access point 108 by a technician associated with the audience measurement entity.

Figure 6:
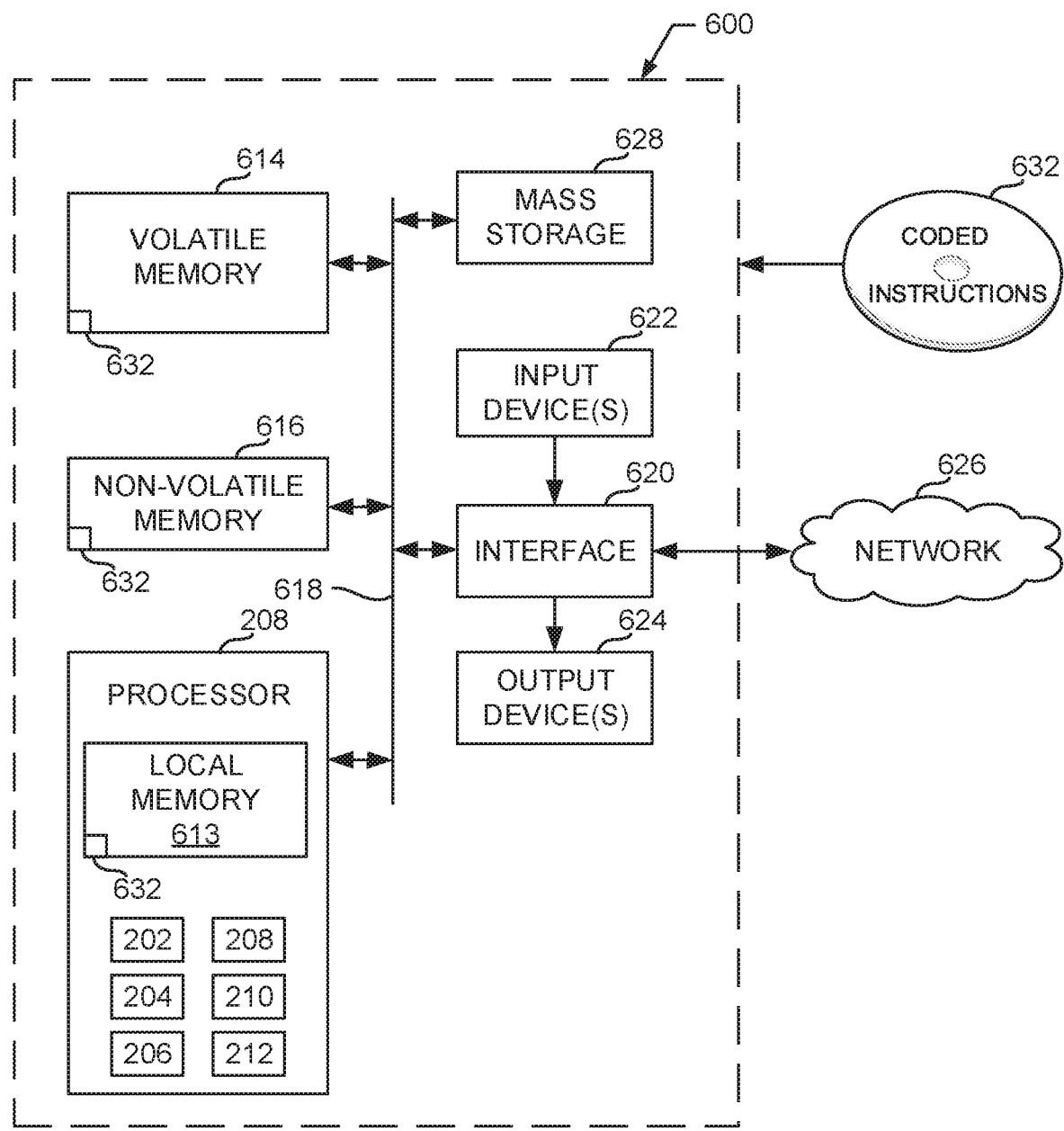
FIG. 6 is a block diagram of an example processing platform structured to execute the instructions of FIGS. 4-5 to implement the alternate access point of FIGS. 1 and/or 2.

FIG. 6 is a block diagram of an example processor platform 600 structured to execute the instructions of FIGS. 4 and 5 to implement the alternate access point 108 of FIG. 2. For example, the processor platform 600 can be a router manufactured to implement the teachings of this disclosure, can be a router that has been modified after manufacture (e.g., modified firmware, modified software, adding or removing hardware, etc.), and/or a combination thereof. Additionally or alternatively, the processor platform 600 can be a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example wireless interface 202, the example traffic monitor 204, the example frame generator 206, the example router 208, the example media monitor 210 and the example ethernet switch 212.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as one or more Ethernet interface(s), one or more universal serial bus(es) (USB), one or more Bluetooth® interface(s), one or more near field communication (NFC) interface(s), and/or one or more PCI express interface(s).

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a WI-FI connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that allow monitoring of Wi-Fi traffic using an alternate access point. The example methods, apparatus and articles of manufacture capture all Wi-Fi traffic that would be routed through the primary access point without needing to decode the traffic. Additionally, because the alternate AP uses the network credentials as the primary AP, it is transparent to users when they are moved to another access point. Furthermore, by broadcasting a change channel announcement, clients using the primary AP can be convinced to transfer to the alternate access point. Such a broadcast can appear to originate with primary AP by capturing a modifying a message transmitted by the primary AP (e.g., selecting a message for modification that is not encrypted by the primary AP). Additionally, if the alternate access point malfunctions, the client device will automatically connect back to the primary access point.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to monitor wireless traffic, the apparatus comprising:
   a first wireless interface to establish a wireless connection with first network credentials to match second network credentials of a primary access point;
   a second wireless interface, different than the first wireless interface, to monitor traffic;
   a traffic monitor to:
      identify, via the traffic monitored via the second wireless interface, a connection of a Wi-Fi client to the primary access point; and
      capture a management frame transmitted from the primary access point to the Wi-Fi client;
   a frame generator to insert a change channel announcement into the captured management frame; and
   a router to cause the first wireless interface to re-transmit the captured management frame including the change channel announcement.

2. The apparatus of claim 1, wherein the channel change announcement is to cause the Wi-Fi client to connect to the apparatus.

3. The apparatus of claim 2, further wherein the traffic monitor is to identify a media request transmitted from the Wi-Fi client to an external network, the media request transmitted via the apparatus and, the apparatus further including a media monitor to extract media identifying information from the media request.

4. The apparatus of claim 3, wherein the media monitor transmits the media identifying information to an audience measurement entity.

5. The apparatus of claim 1, wherein the same network credentials enable the Wi-Fi client to reconnect to the primary access point if the apparatus is disabled.

6. The apparatus of claim 1, wherein the first wireless interface is to configure the apparatus to have a different channel than the primary access point, the channel change announcement to instruct the Wi-Fi client to use the different channel.

7. A method to monitor wireless traffic, the method comprising:
establishing, via a first wireless interface, a wireless connection with first network credentials to match second network credentials of a primary access point;
monitoring, via a second wireless interface, traffic, the second wireless interface different than the first wireless interface;
identifying, via the traffic monitored via the second wireless interface, a connection of a Wi-Fi client to the primary access point;
capturing, via the alternate access point, a management frame transmitted from the primary access point to the Wi-Fi client;
inserting a change channel announcement into the captured management frame; and
re-transmitting, via the first wireless interface, the captured management frame including the change channel announcement.

8. The method of claim 7, wherein the channel change announcement is to cause the Wi-Fi client to connect to the alternate access point.

9. The method of claim 8, further including:
identifying a media request transmitted from the Wi-Fi client to an external network; and
extracting media identifying information from the media request.

10. The method of claim 9, further including transmitting the media identifying information to an audience measurement entity.

11. The method of claim 7, wherein the same network credentials enable the Wi-Fi client to reconnect to the primary access point if the alternate access point is disabled.

12. The method of claim 7, further including configuring the alternate access point to have a different channel than the primary access point, the channel change announcement including instruct the Wi-Fi client to use the different channel.

13. A non-transitory computer readable medium including instructions, which when executed, cause a processor to:
establish, via a first wireless interface, a wireless connection with first network credentials to match second network credentials of a primary access point;
monitor, via a second wireless interface, traffic, the second wireless interface different than the first wireless interface;
identify, via the traffic monitored via the second wireless interface, a connection of a Wi-Fi client to the primary access point; and
capture, via the alternate access point, a management frame transmitted from the primary access point to the Wi-Fi client;
insert a change channel announcement into the captured management frame; and
re-transmit, via the first wireless interface, the captured management frame including the change channel announcement.

14. The non-transitory computer readable medium of claim 13, wherein the channel change announcement is to cause the Wi-Fi client to connect to the alternate access point.

15. The non-transitory computer readable medium of claim 14, wherein the instructions further cause the processor to:
identify a media request transmitted from the Wi-Fi client to an external network; and
extract media identifying information from the media request.

16. The non-transitory computer readable medium of claim 15, wherein the instructions further cause the processor to transmit the media identifying information to an audience measurement entity.

17. The non-transitory computer readable medium of claim 13, wherein the same network credentials enable the Wi-Fi client to reconnect to the primary access point if the alternate access point is disabled.

* * * * *